(12) United States Patent
Otani et al.

(10) Patent No.: US 7,019,226 B2
(45) Date of Patent: *Mar. 28, 2006

(54) SWITCH CONTACT STRUCTURE

(75) Inventors: Toshiya Otani, Tokyo (JP); Hideaki Akimoto, Tokyo (JP)

(73) Assignee: Niles Parts Co., Ltd., (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/986,305

(22) Filed: Nov. 12, 2004

(65) Prior Publication Data

US 2005/0087431 A1    Apr. 28, 2005

Related U.S. Application Data

(63) Continuation of application No. 10/255,600, filed on Sep. 27, 2002, now Pat. No. 6,872,897.

(30) Foreign Application Priority Data

Oct. 22, 2001    (JP) ............................ P2001-323933

(51) Int. Cl.
*H01H 21/54*    (2006.01)

(52) U.S. Cl. ................. 200/16 D; 200/61.54; 200/540; 200/252

(58) Field of Classification Search ............ 200/61.54, 200/61.27, 61.3, 61.34, 11 G, 16 D, 237, 200/251, 252, 257–260, 303, 540–550

See application file for complete search history.

(56) References Cited

U.S. PATENT DOCUMENTS

| 4,092,504 A | 5/1978 | Kotaka |
| 4,352,964 A | 10/1982 | English |
| 4,694,129 A | 9/1987 | Olsson |
| 5,669,489 A | 9/1997 | Von Ende |
| 5,708,241 A | 1/1998 | Lin |

FOREIGN PATENT DOCUMENTS

| JP | 2000-513871 | 10/2000 |
| WO | WO 98/45866 | 10/1998 |

*Primary Examiner*—Lincoln Donovan
*Assistant Examiner*—M. Fishman
(74) *Attorney, Agent, or Firm*—Rader, Fishman & Grauer PLLC

(57) ABSTRACT

To enable reduction of the number of components and weight, improvement of workability, and reduction of the costs, a switch contact structure is disclosed, which comprises a substrate 65, a movable block 73 disposed so as to be movable along the substrate 65, a fixed contact 67 mounted on the substrate 65, and a movable contact mounted on the movable block 73, wherein the movable contact is brought into and out of contact with the fixed contact 67 by the movement of the movable block 73 along the substrate 65, characterized in that the fixed contact 67 is formed of conductive wire material, and in that both ends 99a, 99b of the fixed contact 67 are fixed on the substrate 65.

3 Claims, 5 Drawing Sheets

SWITCH CONTACT STRUCTURE

The present application is a continuation of U.S. patent application Ser. No. 10/255,600, filed on Sep. 27, 2002, now U.S. Pat. No. 6,872,897, issued on Mar. 29, 2005, and is hereby incorporated in its entirety by reference.

BACKGROUND OF THE INVENTION

1. Field of the Invention

The present invention relates to a switch contact structure.

2. Description of the Related Art

Hitherto, the switch contact structure of this type includes, for example, the one disclosed in International Patent Publication No.2000-513871. This switch contact structure in the related art is constructed in such a manner that the wire contact formed of wire is provided, and the wire contact is fixed on the substrate at one end, and is formed with a contact portion that is brought into and out of contact with the movable contact at the other end that corresponds to a free end. Therefore, an area occupied by the contact is small, and thus a compact structure is achieved. Simultaneously, it can be fixed easily and the costs may be reduced.

However, since the switch contact structure as described above is constructed in such a manner that the movable block slides upward and downward and the movable contact of the movable block is brought into and out of contact with the contact portion of the wire contact, the length of the wire contact must be longer than the moving distance of the movable block. Therefore, the wire contact is brought into the long cantilevered state, and thus the wire contact is subject to a large moment when the movable contact is brought into contact and liable to be bend, which results in variations in contact pressure due to external forces. Therefore, it requires provision of a support for preventing the wire contact from being deformed at the base of the wire contact, which leads to a complicated structure of the substrate.

SUMMARY OF THE INVENTION

Accordingly, it is a subject of the present invention to provide a switch contact structure in which a stable contact pressure is ensured without providing a support for a contact on the substrate.

The invention according to (1) is a switch contact structure comprising a substrate, a movable block disposed so as to be movable along the substrate, a fixed contact mounted on the substrate, and a movable contact mounted on the movable block, wherein the movable contact is brought into and out of contact with the fixed contact by the movement of the movable block along the substrate, wherein the fixed contact is formed of conductive wire material, and in that both ends of the fixed contact are fixed on the substrate.

The invention according to (2) is a switch contact structure as set forth in (1), wherein the both ends of the fixed contact are inserted into through holes formed on the substrate and fixed on the substrate by soldering.

The invention according to (3) is a switch contact structure as set forth in (1) or (2), wherein a contact portion for being brought into and out of contact with the movable contact is formed at the midpoint of the fixed contact by bending the conductive wire material so as to project toward the movable contact, and a resilient portion for allowing the contact portion to be brought into resilient contact with the movable contact is formed at the position adjacent to the contact portion.

The invention according to (4) is a switch contact structure as set forth in any one of (1) to (3), wherein the movable block is formed with regulatory projections that straddle the fixed contact so as to be positioned lower than the fixed contact.

According to the invention as set forth in (1), since a substrate, a movable block disposed so as to be movable along the substrate, a fixed contact mounted on the substrate, and a movable contact mounted on the movable block are provided, so that the movable block moves along the substrate, the movable contact may be brought into and out of contact with the fixed contact. In addition, since the fixed contact is formed of conductive wire material, and both ends of the fixed contact are fixed on the substrate, the fixed contact being formed of conductive wire material may be brought into and out of contact with the movable contact in the straddle mounted state, and thus a stable contact pressure is achieved.

Moreover, since it is not necessary to provide a support for supporting the fixed contact stably on the substrate, the structure of the substrate may be simplified.

Furthermore, since the fixed contact is formed of conductive wire material, the fixed contact may be attached on the substrate in the same manner as a staple, whereby the number of assembling processes and the costs may be reduced. Since the fixed contact is formed by cutting a length of conductive wire material, it can be manufactured easily and thus the costs may be reduced.

In addition to the effect of the invention according to (1), in the invention according to (2), since the fixed contact may be assembled and soldered on the substrate using a machine, automatic assembly may be employed, and thus a switch contact structure having a structure suitable for mass production may be provided.

In addition to the effect of the invention according to (1), in the invention according to (3), since a contact portion for being brought into and out of contact with the movable contact is formed at the midpoint of the fixed contact by bending the conductive wire material so as to project toward the movable contact, and the resilient portion for bringing the contact portion into resilient contact with the movable contact is formed at the position adjacent the contact portion, the resilient portion ensures resilient contact between the contact portion and the movable contact, and thus the stable contact pressure may be achieved. Furthermore, since the resilient portion is formed by bending conductive wire material, a specific contact spring is not necessary. Therefore, the number of components may be reduced and thus assembly and parts management may be facilitated.

In addition to the effect of the invention according to any one of (1) to (3), in the invention according to (4), since the regulatory projections straddling the fixed contact are formed on the movable block so as to be positioned lower than the fixed contact, even when an inadvertent external force is applied on the movable block, the regulatory projections on the movable block are brought into contact with the substrate and prevent the fixed contact from bent more than ascertain extent, though the fixed contact is somewhat bent by being pressed by the movable block. Therefore, permanent deformation of the fixed contact may be prevented.

DESCRIPTION OF THE PREFERRED EMBODIMENTS

Figure 1:
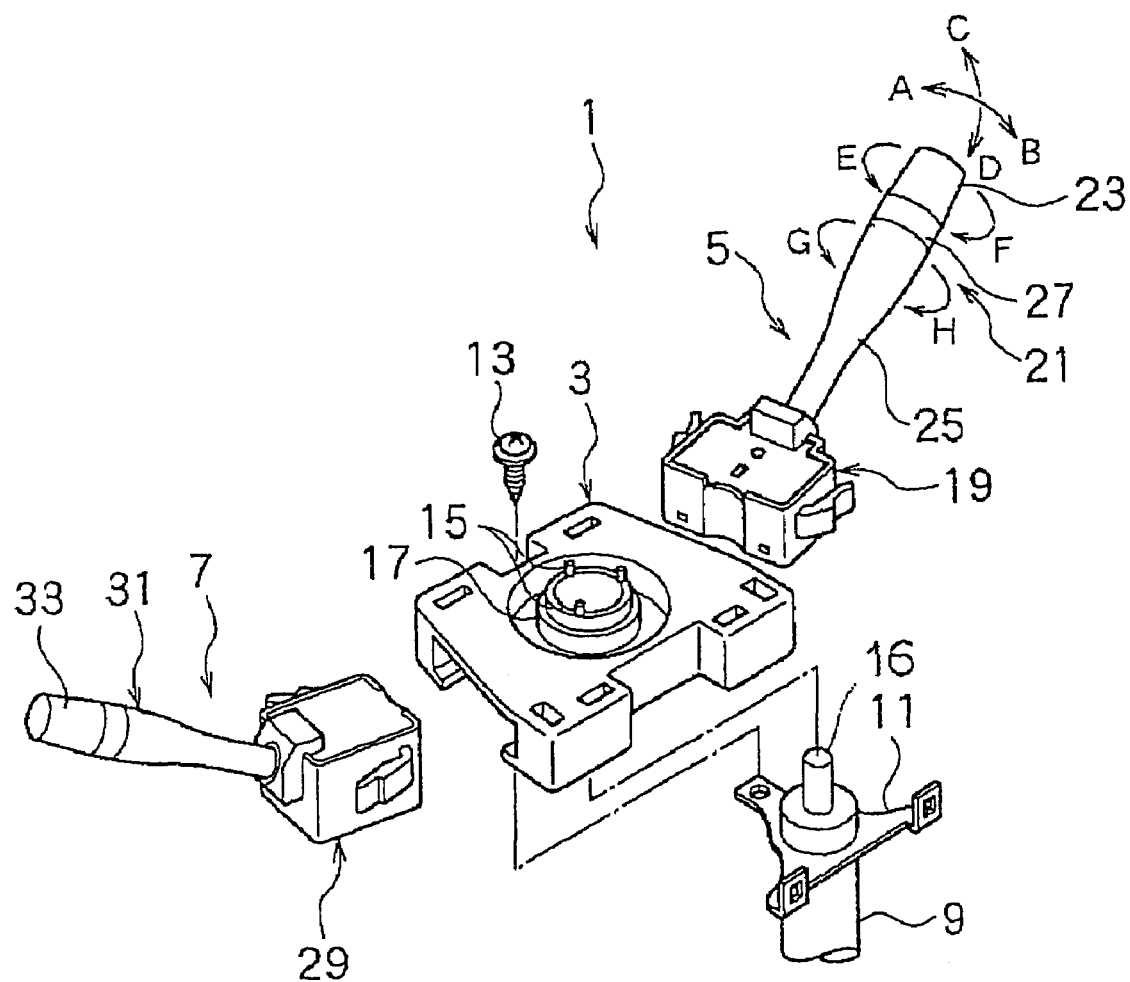
FIG. 1 is a general exploded perspective view of a combination switch for vehicles embodying an embodiment of the present invention.
Figure 2:
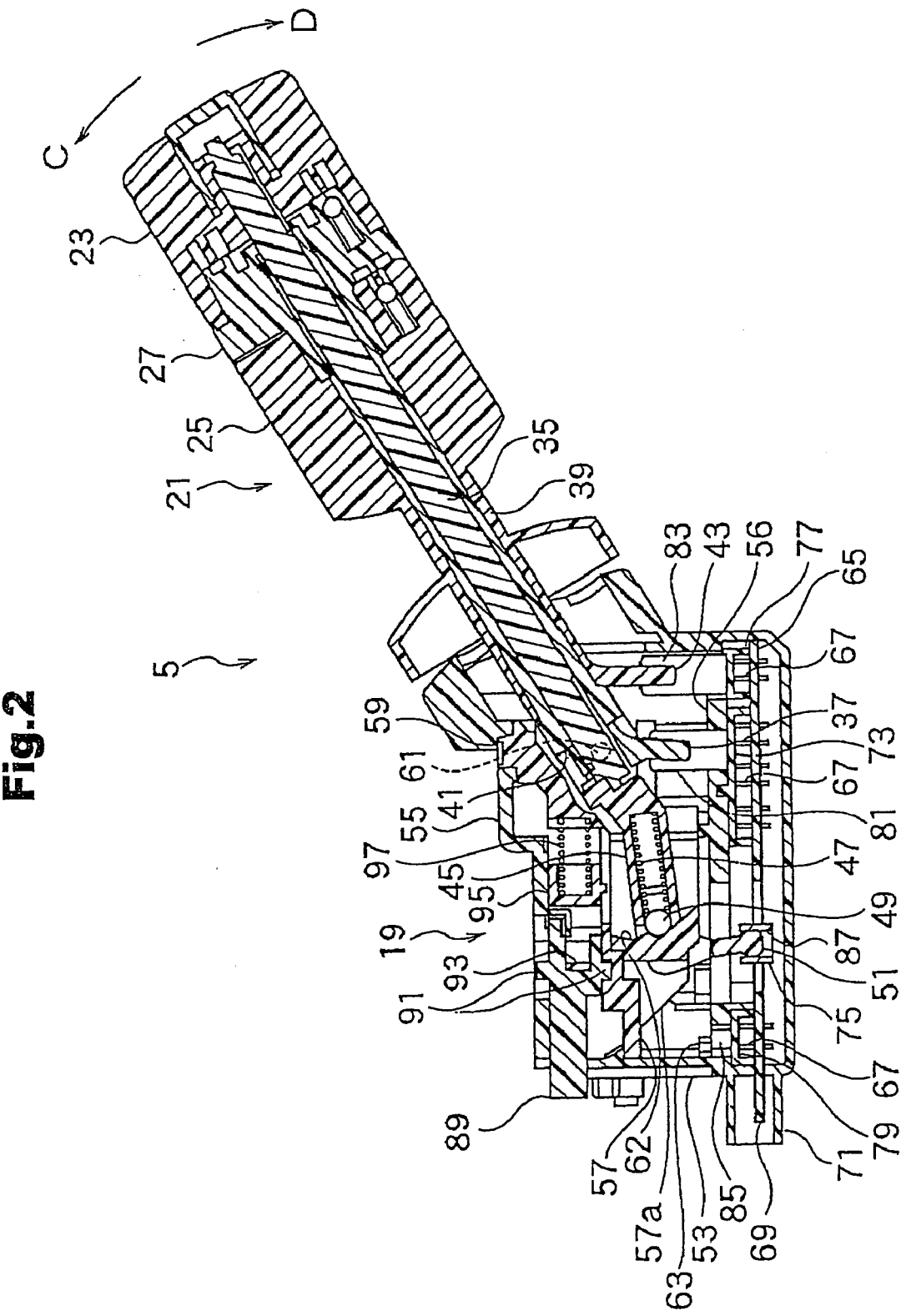
FIG. 2 is a cross sectional view of the first lever switch according to an embodiment.

FIG. 1 is an exploded perspective view of a combination switch for vehicles embodying the switch contact structure of the present invention. FIG. 2 is a cross sectional view of the first lever switch.

As shown in FIG. 1, the combination switch 1 for vehicles includes a body 3, and a first and second lever switches 5, 7. The aforementioned body 3 is locked on a bracket 11 of a steering column 9, and secured by a setscrew 13. The aforementioned body 3 is formed with a cancel pin 15 and rotatably supports a cylindrical pipe 17 rotating with a steering shaft 16. The first lever switch 5 is inserted into the body 3 from the right side and the second lever switch 7 is inserted into the body 3 from the left side.

The first lever switch 5 has functions of, for example, a turn signal switch, a passing switch, a main-dimmer changeover switch, a headlamp switch, and a fog lamp switch.

The first lever switch 5 includes a switch section 19 and a control lever section 21. The switch section 19 is inserted into the aforementioned body 3 as described above. The control lever section 21 includes a revolving knob 23, a third lever 25, and a fixed knob 27 as in FIG. 1 so as to be swingable in the fore-and-aft direction as indicated by the arrows A and B, and the vertical direction as indicated by the arrows C and D.

The first lever switch 5 has a function of a turn signal switch for flashing the direction indicator lamp by operating the control lever section 21 in the lateral directions indicated by the arrows A and B, and a function of a passing switch for turning the headlamp on temporarily by moving the control lever section 21 to the upper limit of the arrow C.

The first lever switch 5 has a function of a main-dimmer changeover switch for switching the headlamp between the main and the dimmer by moving the control lever section 21 vertically as indicated by the arrows C or D.

The aforementioned control lever section 21 has a function as a headlamp switch for turning the headlamp and small lamp on and off by rotating the revolving knob 23 in the direction indicated by the arrows E and F. The control lever section 21 has a function as a fog lamp switch for turning the fog lamp on and off by rotating the third lever 25 in the direction indicated by the arrows G or H.

The second lever switch 7 is provided with a switch section 29 and the control lever section 31. The switch section 29 is inserted into the body 3 as described above. The control lever section 31 has a function as a wiper and washer switch, and is adapted to be operated in the fore-and-aft and vertical directions in the same manner as the control lever section 21. A rotary switch 33 provided at the distal end thereof has a function to adjust the wiper speed.

As shown in FIG. 2, a first lever shaft 35 whereof one end is fixed to the revolving knob 23 is integrally provided with a first control rod 37 on the side of the distal end thereof. The first lever shaft 35 is provided on the outer peripheral side thereof with a hollow second lever shaft 39 in which the first lever shaft 35 is rotatably inserted. The second lever shaft 39 is connected to the fixed knob 27 at one end thereof, and formed with a detent body supporting tube 45 integrally at the other end thereof. The third lever 25 is rotatably disposed on the outer peripheral side of the second lever shaft 39, and is provided with a third control rod 43 on the side of the distal end thereof.

The detent body supporting tube 45 accommodates a detent spring 47 and a detent body 49. The second lever shaft 39 is formed with a shaft 61 to be rotatably supported by a movable member 57 so as to be project from the left and right side surfaces. The second lever shaft 39 is formed with a through hole 41, through which the first control rod 37 is swingably inserted, at the position orthogonal to the shaft 61. An end of a second control rod 51 formed of a L-shaped link member is rotatably connected to both side surfaces of the detent body supporting tube 45. The second control rod 51 is rotatably supported on a rotatably supporting strip 57a whereof the center portion is pended from the inner top surface of the movable member 57 and is connected to a second movable block 75 at the other end thereof. The second control rod 51 rotates about the central axis when the control lever section 21 is swung in the directions indicated by the arrows C, D, and extends the distance of the linear movement of the second movable block 75 connected to the other end.

The switch section 19 is provided with a case 53 and a lid member 55 to be fitted on the upper opening of the case 53. A partition wall 56 is provided in the case 53 on the bottom side, and the movable member 57 is disposed above the partition wall 56. The movable member 57 is rotatably supported on the upper end on the lid member 55 a the shaft 59 thereof, the detent body (not shown) resiliently mounted on the outside thereof is brought into resilient contact with a detent groove (not shown) formed on the inner wall of the case 53 so that the control lever section 21 is supported at a neutral position, at the right turn supporting position (B), and the left turn indicating position (A). The control lever section 21 is rotatably supported by the shaft 61 on the movable member 57 and the detent body 49 is brought into resilient contact with the detent groove 62 so that the control lever 21 is supported in the main position and in the dimmer position and so that the control lever 21 returns from the passing position to the normal position automatically. The movable member 57 is provided with a fourth control rod 63.

A substrate 65 is disposed under the partition wall 56. The substrate 65 is provided with a plurality of fixed contacts 67 on the upper side thereof, and a diode mounted on the lower side thereof. A card edge connector 69 is provided at the end of the substrate 65. The card edge connector 69 is projected in a hood 71 of the aforementioned case 53.

The first movable block 73, the second movable block 75, the third movable block 77, and the fourth movable block 79 are disposed on the substrate 65 under the partition wall 56. The first, the third, and the fourth movable blocks 73, 77, 79 are disposed so as to be linearly movable in the direction orthogonal to the plane of FIG. 2, and the second movable block 75 is disposed so as to be linearly movable in the lateral direction in FIG. 2.

It is constructed in such a manner that the headlamp is turned on and off by the linear movement of the first movable block 73, changeover between the main and the dimmer and passing are made by the linear movement of the second movable block 75, the fog lamp is turned on and off by the linear movement of the third movable block 77, and flashing of the direction indicator lamp is made by the linear movement of the fourth movable block 79.

The first, the third, and the fourth movable blocks 73, 77, 79 are provided with engaging sections 81, 83, 85, and the second movable block 75 is formed with a hole section 87 for moving the first, second, third, and fourth movable blocks 73, 75, 77, 79 linearly as described above. The engaging section 81 engages the first control rod 37, the engaging section 83 engages the third control rod 43, the engaging section 85 engages the fourth control rod 63, and the hole section 87 engages the second control rod 51 respectively.

A cancel cam 89 is disposed between the case 53 and the lid member 55, and a vertical shaft 91 of the cancel cam 89 is loose fitted and rotatably supported in the lid member 55 and the movable member 57. The cancel cam 89 is urged toward the left in FIG. 2 by a leaf spring 93 held by the lid member 55 at both ends.

A cam guide 95 placed on the movable member 57 is disposed behind (right side in FIG. 2) the cancel cam 89. The cam guide 95 is urged toward the cancel cam 89 by a coil spring 97 disposed between the cam guide 95 and the movable member 57.

When the driver moves the control lever section 21 in the directions indicated by the arrows A and B in FIG. 1 in cooperation with the cancel cam 89, the leaf spring 93, the cam guide 95, the coil spring 97, and the cancel pin 15 in FIG. 1 to give a movement direction by the turn signal, and then moves the steering wheel back, the control lever section 21 is returned automatically to the neutral position. Alternatively, the driver can hold the turn signal in the state of giving a movement direction by the compulsive operation of the control lever section 21 of the driver irrespective of movement of the steering wheel.

When the aforementioned control lever section 21 is moved for example in the directions indicated by the arrows A and B in FIG. 1, the control lever section 21 rotates about the shaft 59 in the direction orthogonal to the plane of FIG. 2 with the movable member 57. This rotary movement allows the fourth movable block 79 to move linearly in the direction orthogonal to the plane of the figure via the fourth control rod 63 and the engaging section 85, and the movable contact of the fourth movable block 79 is brought into contact with the fixed contact 67 on the side of the substrate 65 to flash the direction indicator lamp to indicate left-hand turn or right-hand turn.

When the aforementioned control lever section 21 is moved in the direction indicated by the arrows C or D in FIG. 1, the control lever section 21 rotates about the shaft 61 in the vertical direction in FIG. 2, and moves the second movable block 75 linearly in the lateral direction in FIG. 2 via the second control rod 51. The linear movement of the second movable block 75 allows the movable contact of the second movable block 75 to be brought into contact with the fixed contact on the substrate 65 and to perform changeover between the main and the dimmer, and passing.

When the revolving knob 23 is rotated in the directions indicated by the arrows E and F in FIG. 1, the first control rod 37 rotates in the direction orthogonal to the plane of FIG. 2 via the first lever shaft 35 in FIG. 2 and allows the first movable block 73 to move linearly in the direction orthogonal to the plane of FIG. 2 via the engaging section 81. This allows the movable contact of the first movable block 73 to be brought into and away from contact with the fixed contact 67 on the side of the substrate 65 in the prescribed state to turn the headlamp or the front position lights on and off.

When the third lever 25 is rotated in the directions indicated by the arrows G and H in FIG. 1, the third control rod 43 is swung in the direction orthogonal to the plane of FIG. 2, and allows movement of the third movable block 77 in the direction orthogonal to the plane of FIG. 2 via the engaging section 83. This linear movement of the third movable block 77 allows the movable contact of the third movable block 77 to be brought into and out of contact with the fixed contact 67 on the side of the substrate 65 in the prescribed state to turn the fog lamp on and off.

Figure 3:
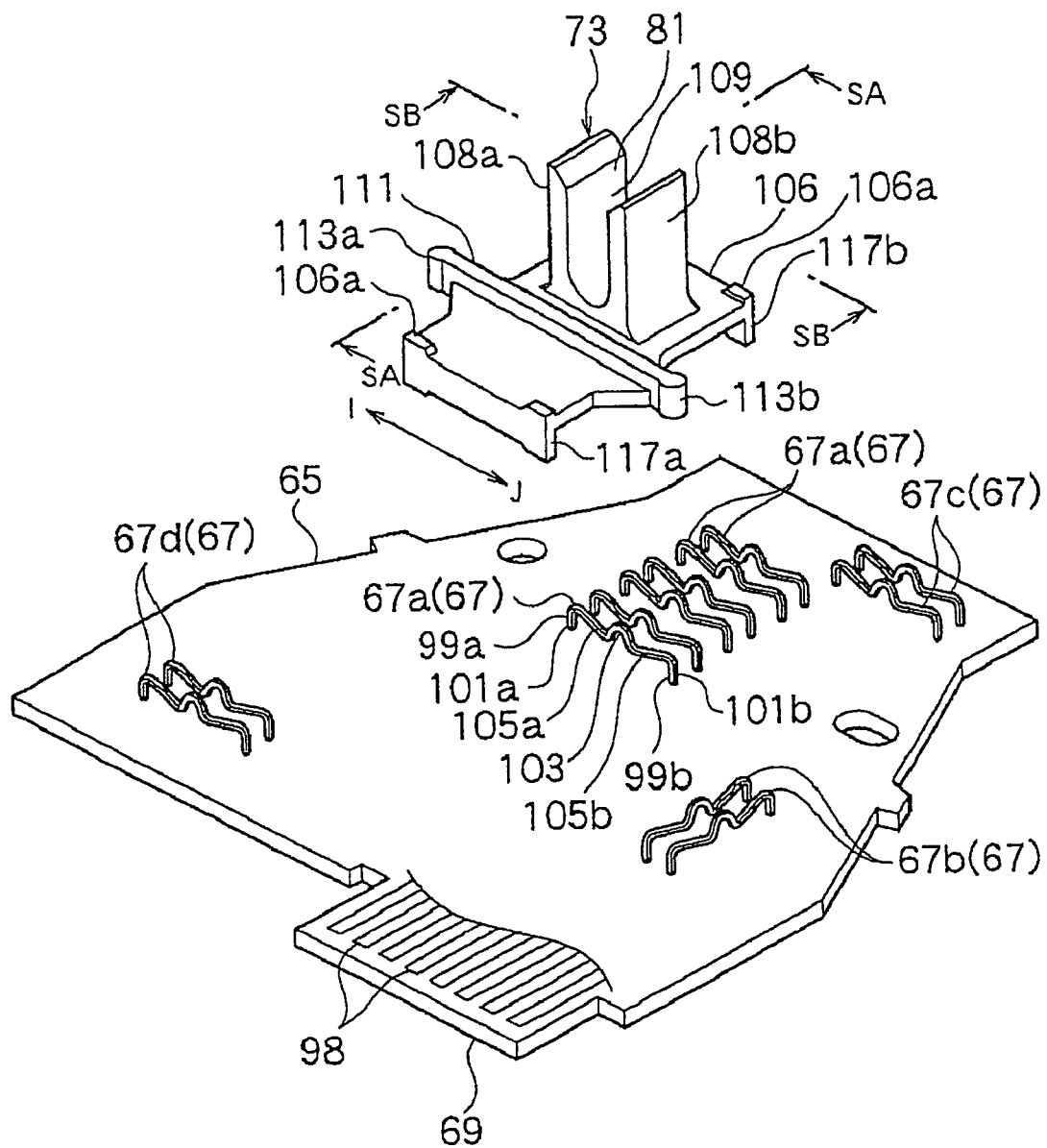
FIG. 3 is an exploded perspective view showing a relation between the first movable block and the polar plate according to an embodiment.

FIG. 3 is an exploded perspective view showing the relation between the substrate 65 and the first movable block 73. The second, third, and fourth movable blocks 75, 77, 79 somewhat differ from the first movable block 73 in shape, but the relation with respect to the substrate 65 is basically the same as the relation between the first movable block 73 and the substrate 65. Therefore, the relation between the first movable block 73 and the substrate 65 will be described as a typical example here.

Figure 4:
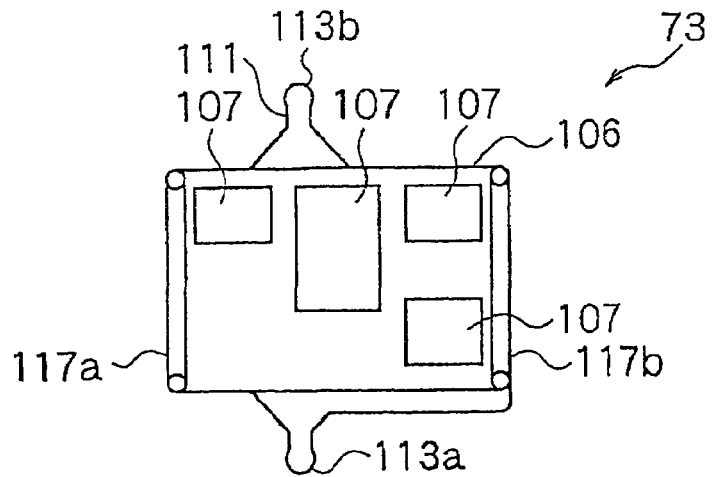
FIG. 4 is a bottom view of the first movable block according to an embodiment.
Figure 5:
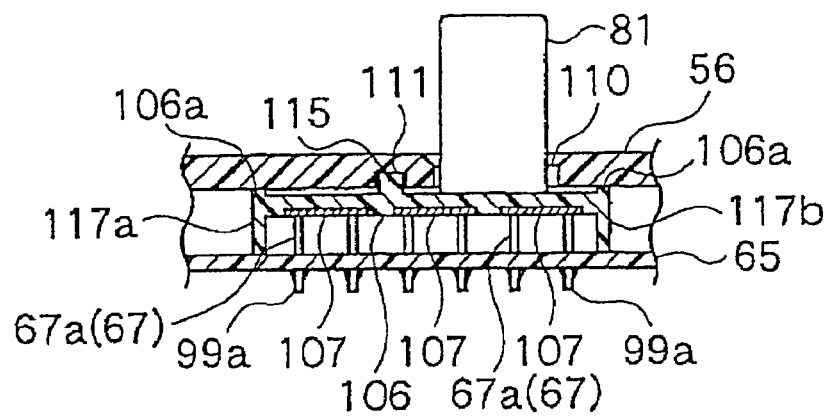
FIG. 5 is a cross sectional view of an embodiment viewed in the direction shown by the arrows SA—SA in FIG. 3.
Figure 6:
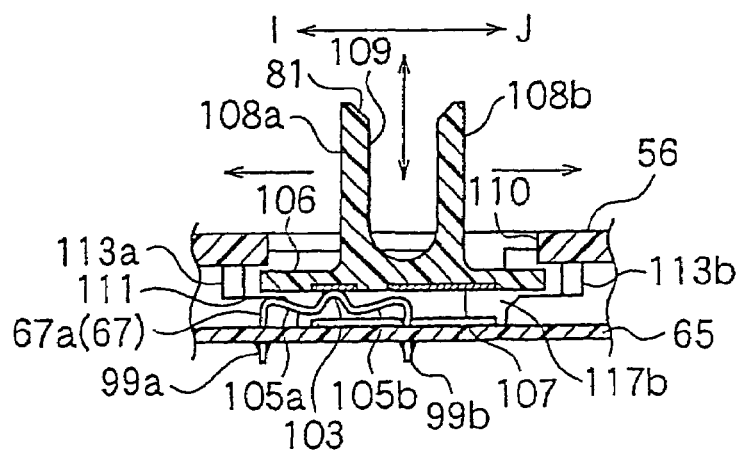
FIG. 6 is a cross sectional view of an embodiment viewed in the direction shown by the arrows SB—SB in FIG. 3.
Figure 7:
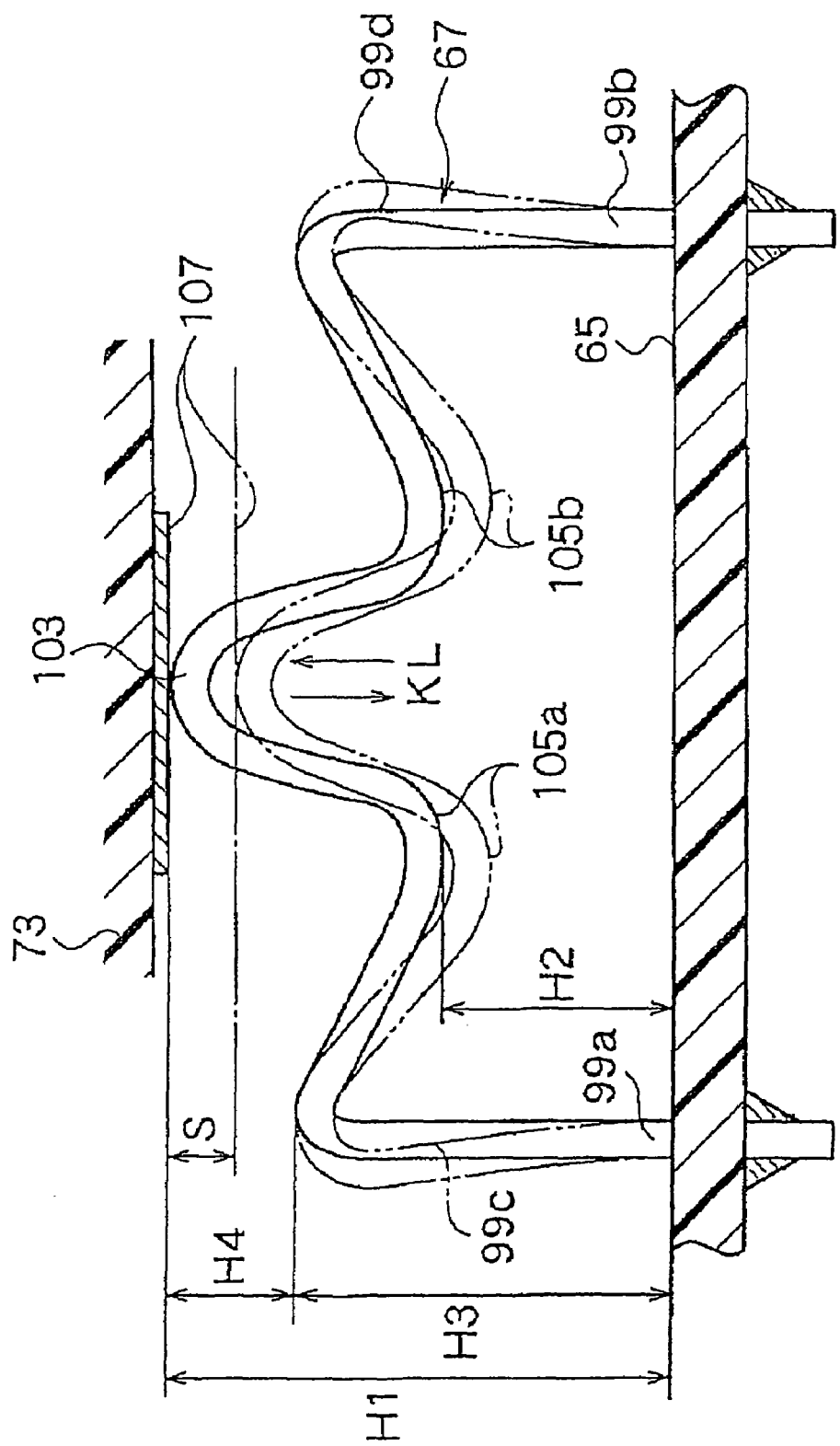
FIG. 7 is an enlarged view of an embodiment showing the portion around the fixed contact.

FIG. 4 is a bottom view of the first movable block, FIG. 5 is a cross sectional view viewed in the direction of the arrows SA—SA in FIG. 3, FIG. 6 is a cross sectional view viewed in the direction of the arrows SB—SB in FIG. 3, and FIG. 7 is an enlarged view showing the area around the fixed contact.

As shown in FIG. 3 to FIG. 6, the first movable block 73 is disposed so as to move linearly in the directions indicated by the arrows I and J shown in FIG. 3 with respect to the fixed contact 67.

The engaging section 81 of the first movable block 73 is constructed in such a manner that a U-shaped engaging groove 109 is formed between engaging walls 108*a*, 108*b* projecting upward from a base 106. The engaging section 81 projects upwardly of the partition wall 56 through an elongated hole 110 formed through the partition wall 56, and engages so as to be capable of linear movement only in the directions indicated by the arrows I and J.

The base portion 106 of the first movable block 73 is provided with a movable contact 107 that is brought into and out of contact with the fixed contact 67*a* on the lower surface thereof. The movable contact 107 is formed, for example, of a three-dimensionally designed circuit MID (Molded Interconnect Device), or by plating or the like.

The base 106 is provided with a substantially plate shaped sliding section 111 formed linearly along the arrows I and J at the center on the upper surface thereof. Both ends 113*a*, 113*b* of the sliding section 111 project from the side surfaces of the base 106 in the directions indicated by the arrows I and J, and are formed into enlarged circular in cross section. Since the length between both ends 113*a*, 113*b* of the first movable block 73 is longer than the width of the base 106, shaking that may occur when it moves in the directions indicated by the arrows I and J may be reduced and thus stabilized.

The sliding section 111 fits into an elongated guiding groove 115 formed on the partition wall 56 so as to extend in the direction I and J, and both the ends 113*a*, 113*b* thereof are guided in the guiding groove 115. In other words, the sliding portion 111 is adapted to be slid and guided along the guiding groove 115 in the directions indicated by the arrows I and J smoothly without being rattled owing to the enlarged ends 113*a*, 113*b*. The base 106 is formed with projections 106*a* to be brought into sliding contact with the partition wall 56 at four corners on the upper surface thereof.

The first movable block 73 is provided with regulatory projections 117a, 117b at both ends orthogonal to the sliding direction thereof. The regulatory projections 117a, 117b are disposed so as to straddle the fixed contact 67 and to be lower than the contact portion 103 of the fixed contact 67.

In other words, it is constructed in such a manner that a slight clearance is formed between the lower ends of the regulatory projections 117a, 117b and the substrate 65 in a state in which the movable contact 107 of the first movable block 73 comes into resilient contact with the fixed contact 67. Therefore, even when an inadvertent external force is exerted on the first movable block 73 during assembly to crush the fixed contact 67a, the regulatory projections 117a, 117b abut against the substrate 65, and thus the fixed contact 67 may be prevented from being crushed, thereby preventing permanent deformation of the fixed contact 67.

The substrate 65 is provided with a prescribed circuit printed on the upper and lower surfaces, and the surfaces thereof are covered by insulating resin. The card edge connector 69 is formed with a circuit terminal of gold plate 98. The substrate 65 may be a polar plate formed by insert molding a conductive metal plate. In this case, the polar plate exposes the gold plate 98 portion and a through hole for soldering the fixed contact 67 from resin forming the polar plate.

As shown in FIG. 3, FIG. 5, and FIG. 6, the substrate 65 is formed with the fixed contact 67 projected therefrom corresponding to the first, second, third, and fourth movable blocks 73, 75, 77, and 79 as described above. Since the fixed contact 67 is formed substantially in the inverted box shape and both ends 113a, 113b thereof are fixed to the substrate 65, it is added with strength more in the longitudinal direction than the direction orthogonal to the longitudinal direction, and thus resists deformation. Therefore, as shown in FIG. 3, it is laid longitudinally along the direction of movement of the first, second, third, and fourth movable block 73, 75, 77, 79.

These fixed contacts 67 are disposed in such a manner that for example six fixed contacts 67a are provided corresponding to the first movable block 73, for example two fixed contacts 67b are provided corresponding to the second movable block 75, for example two fixed contacts 67c are provided corresponding to the third movable block 77, and for example two fixed contacts 67d are provided corresponding to the fourth movable blocks 79. These fixed contacts 67 used here are of conductive wire material formed of beryllium copper (BeCu) applied with silver (Ag) plate. The fixed contact 67 is formed by cutting for example a length of elongated conductive wire material into a prescribed length and formed substantially in the inverted box shape. Therefore, manufacturing of the fixed contact 67 is facilitated, and the costs may be reduced.

The fixed contact 67 is bent at both ends 99a, 99b downward, and fixed on the substrate 65. This fixation of the fixed contact 67 with respect to the substrate 65 is performed by forming through holes 101a, 101b on the substrate 65, inserting both ends 99a, 99b of the fixed contact 67a into the through holes 101a, 101b so that the both ends 99a, 99b projects from the lower surface side of the substrate 65, and soldering the both ends 99a, 99b to the circuit on the lower surface side of the substrate 65.

The fixed contact 67 is formed at the midpoint thereof with a contact portion 103 that is brought into and out of contact with the movable contact. The contact portion 103 is a first curved portion formed by bending the distal end portion toward the first movable block 73 into the curved shape so as to reduce sliding friction with respect to the movable contact. The contact portion 103 is a projecting portion formed at the midsection of the fixed contact 67 as shown in FIG. 7, and positioned at the highest point of the fixed contact 67 with respect to the substrate 65 where the both ends 99a, 99b are fixed. The height thereof is H1. Formed on both ends of the contact portion 103 are resilient portions 105a, 105b (second bent portion) formed by being bent toward the substrate 65. The height H2 from the lower end portions of the resilient portions 105a, 105b (second bent portion) to the substrate 65 is lower than the height H3 of the contact portion 103 (first bent portion) and the upper end (third bent portion) of the post portions 99c, 99d that will be described later. The post portion 99c and the post portion 99d are disposed substantially vertically on the substrate 65 at the same distance as between the ends 99a, 99b, and are formed so as to be capable of being brought into alignment with and being easily inserted into the through holes 110a, 101b.

The fixed contact 67, being formed with a plurality of bent portions including the first bent portion, the second bent portion, and the third bent portion, is constructed in such a manner that when the contact portion 103 (first bent portion) is pressed down, the second bent portion and the third bent portion deform, and is given resiliency in the vertical direction. Therefore, a contact spring is not necessary any more. The height of the contact portion 103 (first bent portion) of the fixed contact 67 is H1 as shown by a solid line in FIG. 7 before assembled to the switch. When the fixed contact 67 is assembled to the switch, the fixed contact 67 moves downward by being pressed by the first movable block 73 in the direction indicated by the arrow K by the length S. The contact portion 103 (first bent portion) moves downward in the direction indicated by the arrow K and presses the resilient portions 105a, 105b (second bent portion) downwardly to be deformed as shown by the phantom line. The resilient portions 105a, 105b (second bent portion) moves downward toward the substrate 65, and presses the post portions 99c, 99d outwardly to be deformed as shown by the phantom line. Accordingly, the fixed contact 67 has a resiliency in the upward direction indicated by the arrow L to restore the original position and shape shown by a solid line, which corresponds to a contact pressure.

The distance S that the first movable block 73 presses the fixed contact 67 is set to be shorter than the height H4 from the contact portion 103 (first bent portion) when the fixed contact 67 is not subject to a load to the upper ends (third bent portion) of the post portions 99c, 99d.

When the first control rod 37 engages the engaging groove 109 of the engaging section 81 and is moved as described above, the first movable block 73 moves linearly in the directions indicated by the arrows I and J in FIG. 3, and the movable contact 107 is brought into and out of contact with the fixed contact 67a to turn the headlamp and front position light on and off.

As described above, since the aforementioned fixed contact 67 is formed of conductive wire material and both ends 99a, 99b of the fixed contact 67 are fixed on the substrate 65, the fixed contact 67 being formed of conductive wire material may be brought into and out of contact with the movable contact 107 in the straddle mounted state, and thus a stable contact pressure is achieved.

Moreover, since it is not necessary to provide a support for supporting the fixed contact 67 stably on the substrate 65, the structure of the substrate 65 may be simplified.

Furthermore, since the fixed contact 67 is formed of conductive wire material, the fixed contact 67 may be attached on the substrate 65 in the same manner as a staple, whereby the number of assembling processes and the costs may be reduced. Since the fixed contact 67 is formed by cutting a length of conductive wire material, it can be manufactured easily and thus the costs may be reduced. Since the fixed contact 67 can be assembled to the substrate 65 automatically by assembling the fixed contact 67 to the substrate 65 with a machine and soldered thereon, the working efficiency of assembly may be significantly improved.

Since a contact portion 103 for being brought into and out of contact with the movable contact 107 is formed at the midpoint of the fixed contact 67 by bending the conductive wire material so as to project toward the movable contact 107, and resilient portions 105*a*, 105*b* for allowing the contact portion 103 to be brought into resilient contact with the movable contact 107 are formed at the position adjacent to the contact portion 103, the resilient portions 105*a*, 105*b* ensure resilient contact between the contact portion 103 and the movable contact 107, and thus the stable contact pressure may be achieved. Furthermore, since the resilient portions 105*a*, 105*b* are formed by bending conductive wire material, a specific contact spring is not necessary. Therefore, the number of components may be reduced and thus assembly and parts management may be facilitated.

As described above, the resilient portions 105*a*, 105*b* for maintaining the contact pressure between the contact portion 103 and the contact portion 103 may be integrated, and thus it is not necessary to provide a separate spring member for holding the contact pressure on the side of the first, second, third and forth movable blocks 73, 75, 77, 79, whereby the shape of the first, second, third and fourth movable blocks 73, 75, 77, 79 may be simplified. From such points of view, the number of components may be reduced, and thus assembly and parts management may be simplified. In addition, since the number of components is small, the structure may be reduced in weight as a whole.

Since the fixed contact 67 is formed of conductive wire material, the raw material is less expensive, and the metal die for molding may be simplified, thereby reducing the cost significantly.

The regulatory projections 117*a*, 117*b* may be omitted. Alternatively, it is also possible not to provide the resilient portions 105*a*, 105*b* on the fixed contact 67, but to provide resilient portions for maintaining contact pressure on the side of the first movable block 73 to allow the resilient portion to be brought into contact with the fixed contact 67.

Thought the switch contact structure is applied to the vehicle lever switch of the combination switch for controlling the headlamp or the like of a vehicle, it may be applied to other switches.

What is claimed is:

1. A switch contact structure, comprising:
   a substrate;
   a movable block disposed so as to be movable along the substrate in a linear direction of movement;
   a fixed contact mounted on said substrate; and
   a movable contact mounted on said movable block;
   wherein said movable contact is brought into and out of contact with said fixed contact by sliding movement of the movable block along said substrate in said linear direction of movement,
   wherein the fixed contact is formed of conductive wire disposed longitudinally along said linear direction of movement, and
   wherein both ends of the fixed contact are fixed on the substrate.

2. The switch contact structure according to claim 1, wherein the both ends of the fixed contact are inserted into through holes formed on the substrate and fixed on the substrate by soldering.

3. The switch contact structure according to claim 1, wherein a contact portion for being brought into and out of contact with the movable contact is formed at the midpoint of the fixed contact by bending the conductive wire material so as to project toward the movable contact, and a resilient portion for allowing the contact portion to be brought into resilient contact with the movable contact is formed at the position adjacent to the contact portion.

* * * * *

UNITED STATES PATENT AND TRADEMARK OFFICE
CERTIFICATE OF CORRECTION

PATENT NO. : 7,019,226 B2  
APPLICATION NO. : 10/986305  
DATED : March 28, 2006  
INVENTOR(S) : Toshiya Otani Page 1 of 1

It is certified that error appears in the above-identified patent and that said Letters Patent is hereby corrected as shown below:

Column 10
Line 34, "wire material" should read -- wire --.

Signed and Sealed this

Twenty-first Day of November, 2006

JON W. DUDAS  
*Director of the United States Patent and Trademark Office*